United States Patent [19]
Michaels

[11] Patent Number: 6,038,079
[45] Date of Patent: Mar. 14, 2000

[54] SAPPHIRE OBJECTIVE SYSTEM

[75] Inventor: Richard J. Michaels, Irvine, Calif.

[73] Assignee: Imagyn Medical Technologies, Inc., Irvine, Calif.

[21] Appl. No.: 08/947,740

[22] Filed: Oct. 9, 1997

[51] Int. Cl.[7] .................................................. G02B 21/02
[52] U.S. Cl. .......................... 359/661; 359/656; 359/657; 359/658; 359/659; 359/660
[58] Field of Search ...................................... 359/656–661

[56] References Cited

U.S. PATENT DOCUMENTS

| | | |
|---|---|---|
| 3,166,623 | 1/1965 | Waidelich, Jr. . |
| 3,901,220 | 8/1975 | Koyasu et al. . |
| 4,059,344 | 11/1977 | Yamasita . |
| 4,111,529 | 9/1978 | Yamashita . |
| 4,267,632 | 5/1981 | Quate . |
| 4,273,109 | 6/1981 | Enderby . |
| 4,403,837 | 9/1983 | Nakahashi . |
| 4,433,898 | 2/1984 | Nasiri . |
| 4,484,059 | 11/1984 | Lillquist . |
| 4,546,771 | 10/1985 | Eggleton et al. . |
| 4,588,691 | 5/1986 | Okada . |
| 4,592,353 | 6/1986 | Daikuzono . |
| 4,662,725 | 5/1987 | Nisioka . |
| 4,694,699 | 9/1987 | Cheeke . |
| 4,718,056 | 1/1988 | Schultheiss . |
| 4,788,967 | 12/1988 | Ueda . |
| 4,806,001 | 2/1989 | Okabe et al. . |
| 4,838,246 | 6/1989 | Hahn et al. ................................ 128/6 |
| 4,867,546 | 9/1989 | Nishioka et al. . |
| 4,979,808 | 12/1990 | Yamagata et al. . |
| 5,050,584 | 9/1991 | Matsuura . |
| 5,166,756 | 11/1992 | McGee et al. . |
| 5,351,322 | 9/1994 | VonBargen . |
| 5,377,669 | 1/1995 | Schulz . |
| 5,424,877 | 6/1995 | Tsuyuki et al. . |
| 5,504,618 | 4/1996 | Hirs et al. . |
| 5,555,131 | 9/1996 | Horton . |
| 5,568,312 | 10/1996 | Horton . |
| 5,630,788 | 5/1997 | Forkner et al. . |
| 5,682,263 | 10/1997 | Robb et al. . |

FOREIGN PATENT DOCUMENTS

| | | |
|---|---|---|
| 37 37 425 A1 | 5/1988 | Germany . |
| 64-908 | 1/1989 | Japan . |
| 0449711 | 11/1974 | Switzerland . |
| 0770471 | 10/1980 | Switzerland . |

*Primary Examiner*—Georgia Epps
*Assistant Examiner*—Michael A Lucas
*Attorney, Agent, or Firm*—Knobbe, Martens, Olson & Bear, LLP

[57] ABSTRACT

Objective lenses for endoscopes are made substantially of sapphire. The high refractive index of sapphire results in optical components with shallower curvatures, leading to smaller geometric aberrations, and consequently, fewer components are required to correct for these aberrations. Chromatic aberrations are less severe because of sapphire's low dispersion. The objectives may be either of the landscape or retrofocus type, and are compact with moderate field of view, low f-number, and less distortion than most conventional designs.

60 Claims, 14 Drawing Sheets

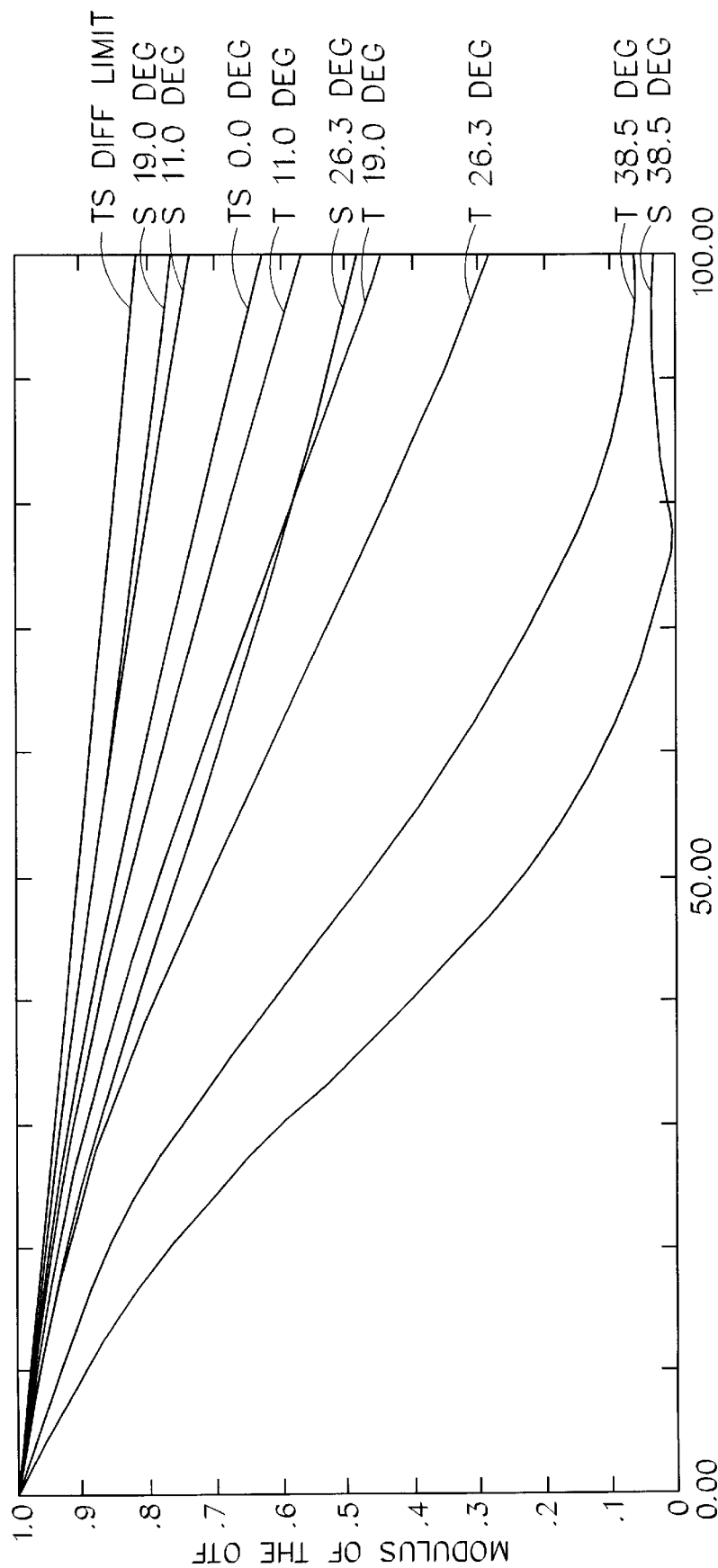

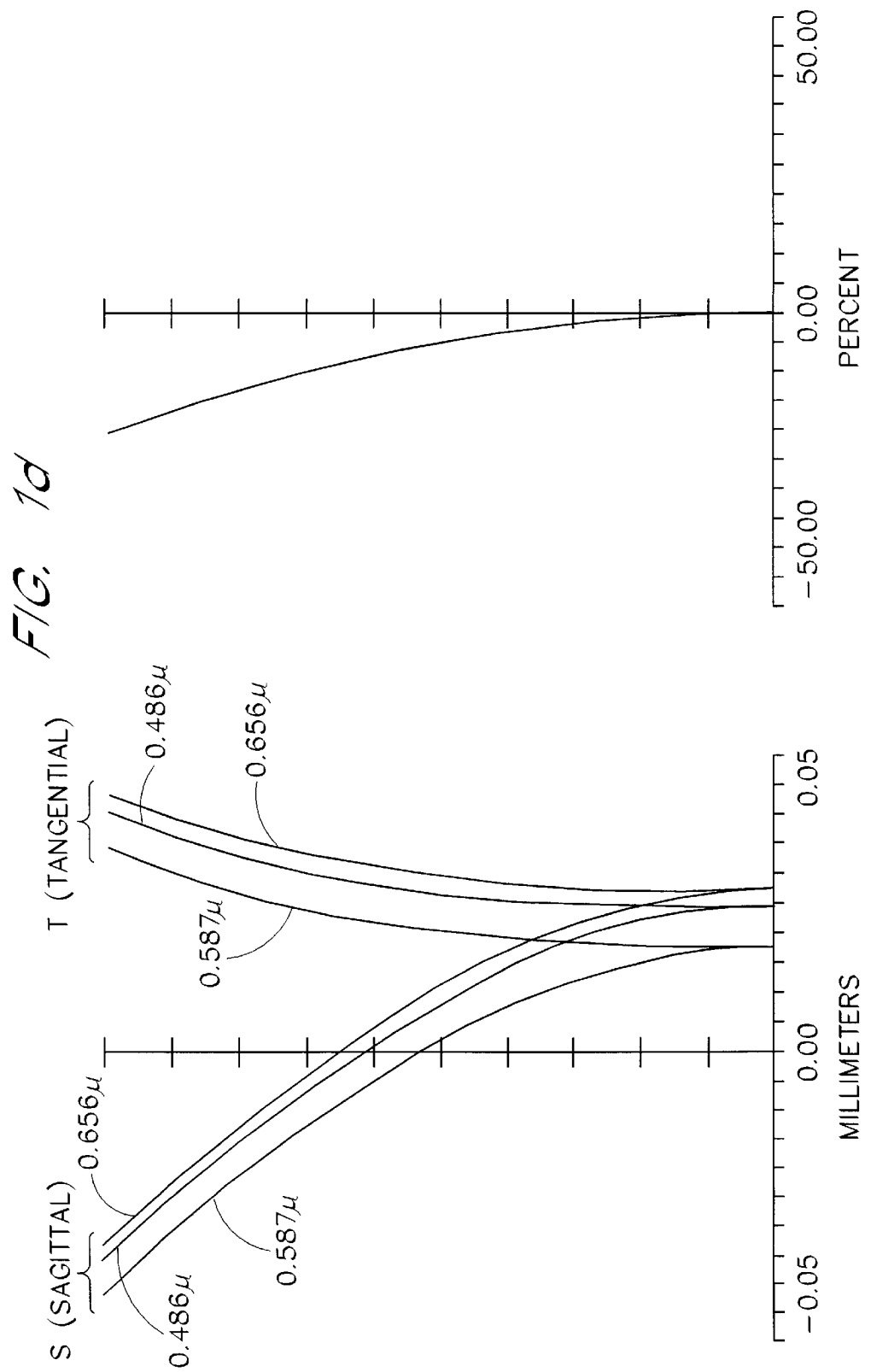

SAPPHIRE OBJECTIVE SYSTEM

BACKGROUND OF THE INVENTION

1. Field of the Invention

The invention relates generally to an objective lens system ("objective") for use in endoscopes and the like, and more specifically to landscape and retrofocus type objectives for endoscopes.

2. Description of the Prior Art

Endoscopy is a technique that allows the examination of an area of a body by means of an endoscope, which is a tube like instrument with lenses and a light source attached. The endoscope provides a visual examination of the interior of a body through a natural body opening such as the throat, or through a small incision into the body. Because an endoscope can be inserted through a very small opening, it is a less invasive method than other surgical techniques, causing less scaring and quicker recovery time. A camera or video recorder is often used during an endoscopic procedure to provide long term records of internal organs which can be used for later reference. The increasing use of endoscopes for both diagnostic and therapeutic uses has substantially reduced the need for invasive surgical procedures such as gynecological and reproductive disorders, biopsies, gastrointestinal track inspection, knee and other joint surgery and the like.

In basic structure, the endoscope typically includes an ocular at its proximal end and an objective assembly at its distal end. Between the ocular and the objective assembly, a typical endoscope will include elongated relay optics of relatively small cross-section. The relay optics can be rigid and include rod lenses spaced along a sheath. Alternatively, the relay optics can be flexible and include optical fibers.

The smaller the cross-section of the distal end of the endoscope, the less invasive the procedure. For medical applications, these optics have to be relatively good and without visible distortion. There is a tension between reducing the cross-section of the endoscope distal end and improving its optical quality. The resulting conventional optical systems used in endoscopes are generally complex and employ various combinations of lenses within the elongated tube or sheath, typically including the objective lens, the relay lens system, and the ocular or eyepiece. The objective lens forms an image at the inner distal end of the tube which is then picked up and transmitted by the relay lens system to the proximal end of the tube where it is viewed with the ocular.

The objective lens is generally a wide angle lens having a short focal length and is physically separated from its environment by a rugged, transparent optical material. In order to correct for the various chromatic as well as geometric aberrations inherent in lenses, it is generally necessary to employ several different lenses, each of which corrects or partially corrects for aberrations in the optical train. Geometric aberrations are typically reduced by increasing the number of lenses or aspherizing one or more surfaces, whereas chromatic aberration can be corrected for by the proper choice of low and high dispersion glasses. Typical prior art endoscope designs include retrofocus lens systems made of glass having one or more aspheric surfaces. (See, for example, U.S. Pat. Nos. 4,403,837 to Nakahasi and 4,867,546 to Nishioka et al.) Unfortunately, these systems are relatively complicated, employing aspheric lenses, and typically have relatively long total tracks and higher than desirable distortion.

The use of sapphire as a material in endoscopic systems has been largely limited to that of a protective covering or window at the distal end of the endoscope. A sapphire barrier at the distal end of an endoscope is said to have enhanced resistance to the higher temperatures and pressures associated with sterilization procedures, such as found in an autoclave. U.S. Pat. No. 5,377,669 to Schulz discloses a sapphire protective covering whose proximal end is so constructed that the sapphire also functions as a negative lens. Although this sapphire negative lens increases the field of view of the objective, following nonsapphire optics are used to correct for geometric and chromatic aberrations. U.S. Pat. No. 5,555,131 to Horton describes an objective that employs a sapphire positive lens/plastic negative lens combination immediately following a virtual image of the stop. The other elements in the optical train are plastic with low indices of refraction and moderate dispersion. Since the refractive index of plastic is relatively low, an endoscope in accordance with the Horton patent has a relatively small field of view and a high f-number. To compensate for plastic's low index of refraction, aspheric surfaces are required, but they do not have enough bending power to limit the lenses to a small diameter, which results in the endoscopic procedure being more invasive in a surgical procedure. U.S. Pat. No. 5,424,877 to Tsuyuki et al. discloses an observation optical system for endoscopes in which the objective lens system may include a sapphire negative lens element for obtaining a wide angle visual field. Sapphire is also used in rod form in fiber optic probe systems (U.S. Pat. No. 5,166,756 to McGee et al. and U.S. Pat. No. 5,351,322 to VonBargen) and as a contact member in a surgical laser probe (U.S. Pat. No. 4,592,353 to Daikuzono).

There is still a need, however, for endoscopic systems, and in particular objective lens systems for endoscopes and the like, that are compact, small in diameter, simple, and offer the user high optical performance.

SUMMARY OF THE INVENTION

The invention relates to landscape and retrofocus type objectives for endoscopes whose objectives are made substantially or entirely from sapphire optical components. The resulting objectives have good fields of view, are rugged enough to withstand high temperatures such as found in an autoclave, of a same diameter, provide fast (i.e., low) f-numbers, and good optical quality with low distortion.

In one embodiment of the invention, there is provided an objective lens system for forming an image at the distal end of an endoscope that is to be transmitted to the proximal end of the endoscope. The objective lens system has a first optical group of a net positive optical power that includes a plurality of optical components, more than one of which comprise sapphire, or alternatively, an all sapphire, first optical group of positive optical power having at least one optical component. The objective lens system also includes an aperture stop on the object side of said first optical group. In one embodiment, the objective lens system further comprises a second optical group on the object side of the first optical group. The second optical group may comprise an optical window such that the objective lens system is of the landscape type, or alternatively, the second optical group may be of negative optical power with the objective lens system being of the retrofocus type.

BRIEF DESCRIPTION OF THE DRAWINGS

FIG. 1b shows ray trace information in the form of spot diagrams for the embodiment of FIG. 1a.

FIG. 1c shows polychromatic diffraction modulation transfer functions for the embodiment of FIG. 1a.

FIG. 1d shows field curvature and distortion plots for the embodiment of FIG. 1a.

DETAILED DESCRIPTION OF THE PREFERRED EMBODIMENT

Figure 1A:
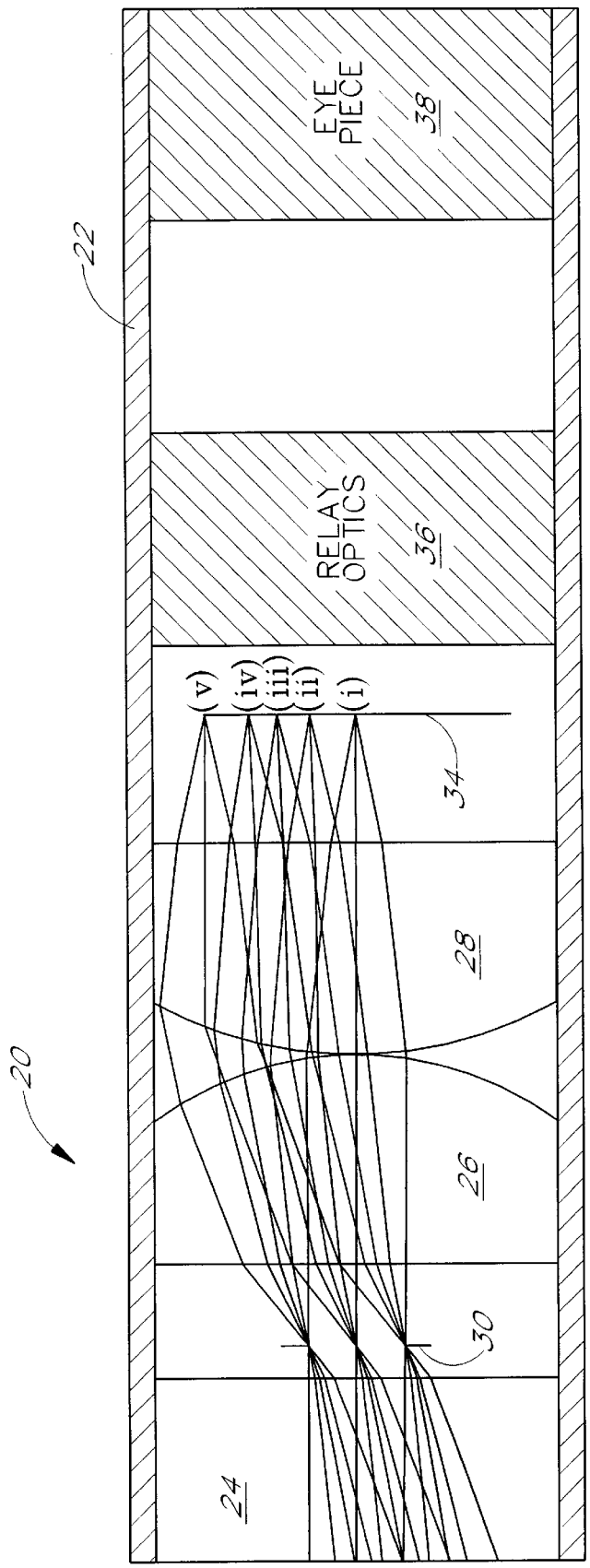
FIG. 1a shows an embodiment of an endoscopic landscape-type objective lens system along with ray paths through the system.

The numerical information and descriptions given below are surface specifications for preferred embodiments of the endoscope objectives according to the present invention, in which Embodiments 1–7 are landscape-type objectives and Embodiments 8–11 are retrofocus-type objectives. Herein "retrofocus" refers to a lens or lens system consisting of an ordinary objective and a negative component near its front focal point. Thus, the back focus is large, relative to its focal length, and the field angle is relatively large. Retrofocus lenses are sometimes referred to as reversed telephoto lens systems. A (rear) landscape-type objective is composed of a stop followed by a positive lens group. In its simplest form, it is a single positive meniscus lens with a stop that is positioned between the lens and the object to minimize coma and tangential field curvature. Other geometric aberrations are either tolerated or minimized by reducing the aperture diameter. It is possible to have a front landscape lens (i.e., a lens with the positive group before the stop), although its aberration residuals are generally much worse than the rear landscape lens. In the embodiments disclosed herein, generally the stop is shifted to the front focal point of the lens group to make the lens telecentric in image space, although this position may be somewhat shifted depending on the numerical aperture of the relay optics to favorably correct aberrations. Spherical aberration is well corrected by the second lens and high refractive index of the sapphire, and therefore faster (i.e., lower) f-numbers are possible. Lateral color is held to negligible levels because of sapphire's low dispersion.

In accordance with the present invention, the objective lens system includes optical elements made of sapphire. Sapphire has a high index of refraction (i.e., $n_d=1.768$), as well as low dispersion, and these optical properties are utilized to produce favorable designs for objective lens systems. In particular, less curvature is required in the optical elements that constitute the objective, so that geometric aberrations are reduced, and the low dispersion leads to less severe chromatic aberration.

The following abbreviations and notation are used throughout: "FOV" is the field of view in degrees, "ROC" is the radius of curvature of the optical element (indicated as infinity in the case of a plano surface), "Thickness" is the center thickness of the optical element (or the distance between elements in the case of a space between elements), and "Diameter" is the diameter at the given surface. All lengths are in millimeters (corresponding to the preferred embodiments). The conic constant defines the curvature of the conic section, in which a conic constant of 0 corresponds to a spherical surface, a conic constant less than −1 to a hyperboloid, a conic constant=−1 to a paraboloid, a conic constant between −1 and 0 to a prolate ellipsoid, and a conic constant greater than 0 to an oblate ellipsoid.

The invention relates to landscape and retrofocus type objectives for endoscopes and the like, in which the objectives are comprised substantially or entirely of sapphire optical components or another material having a high index of refraction (on the order of 1.7 or greater) and a high Abbe number (on the order of 65 or greater). Because sapphire has a high index of refraction ($n_d=1.768$), there is effectively more bending power per surface, and therefore less curvature is required to bring an image to a focus, so that geometric aberrations are reduced. Furthermore, sapphire has low dispersion (i.e., an Abbe number of 72.2), so that chromatic aberrations are intrinsically less severe. Because of these favorable optical properties, the lens objectives of the present invention are compact and have excellent optical properties, such as moderately wide field of view (up to about 80° or less) and relatively fast f-numbers (e.g., down to about 1.7), which makes them advantageous for endoscopic use. Additionally, sapphire is a highly durable material that may be fabricated more precisely and to higher optical quality than conventional glasses or plastics. Further, because of sapphire's high index of refraction, an antireflection coating may consist of only a single layer of magnesium fluoride, instead of the multiple layers generally required for glass optics.

FIG. 1a shows a first preferred embodiment of the present invention. The surface specifications of Embodiment 1 appear in Table 1. This embodiment is advantageous due to the low number of lenses and the simplicity of their design, but edge performance is better in other embodiments. At the object side of an objective 20 within an endoscopic sheath 22, there is preferably a window 24 followed by two plano-convex sapphire elements 26 and 28. The window 24 in this and the other embodiments physically separates the objective 20 from the surrounding environment. The window is preferably made of sapphire but alternatively can be polycarbonate, fused silica or another transparent optical material.

TABLE 1

EMBODIMENT 1
Image space F/# = 2.5
Effective focal length = 8.150E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object | | Infinity | 2.000E + 001 | | 3.254E + 001 | 0 |
| 1 | 24 | Infinity | 6.100E − 001 | Sapphire | 1.330E + 000 | 0 |
| 2 | 24 | Infinity | 0 | | 1.330E + 000 | 0 |
| 3 (Dummy) | | Infinity | 1.100E − 001 | | 4.997E − 001 | 0 |
| Stop | 30 | Infinity | 2.747E − 001 | | 3.260E + 000 | 0 |
| 5 | 26 | Infinity | 7.000E − 001 | Sapphire | 1.350E + 000 | 0 |
| 6 | 26 | −1.120E + 000 | 0 | | 1.350E + 000 | 0 |

TABLE 1-continued

EMBODIMENT 1
Image space F/# = 2.5
Effective focal length = 8.150E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| 7 | 28 | 1.420E + 000 | 6.999E − 001 | Sapphire | 1.350E + 000 | 0 |
| 8 | 28 | Infinity | 4.273E − 001 |  | 1.350E + 000 | 0 |
| IMAGE | 34 | Infinity |  |  | 1.029E + 000 | 0 |

The window 24 and sapphire element 26 are preferably separated by an aperture stop 30, although in all the embodiments discussed herein, the aperture stop can alternatively be located on the object side of the most distal optical component or within the objective. In this and the other embodiments, if a window is not used, then the aperture stop is preferably placed in direct contact with the outside of the most distal of the sapphire elements so as to avoid clogging the aperture. Elements 26 and 28 are preferably in contact with each other so that ancillary spacers are not required. The objective 20 images an object onto a focal plane 34 on the image side of the objective at the distal end of the endoscope, with the image being transmitted to the proximal end of the endoscope, generally through relay optics 36 (shown schematically) that may include a fiber optic followed by an eyepiece 38.

Figure 1B:
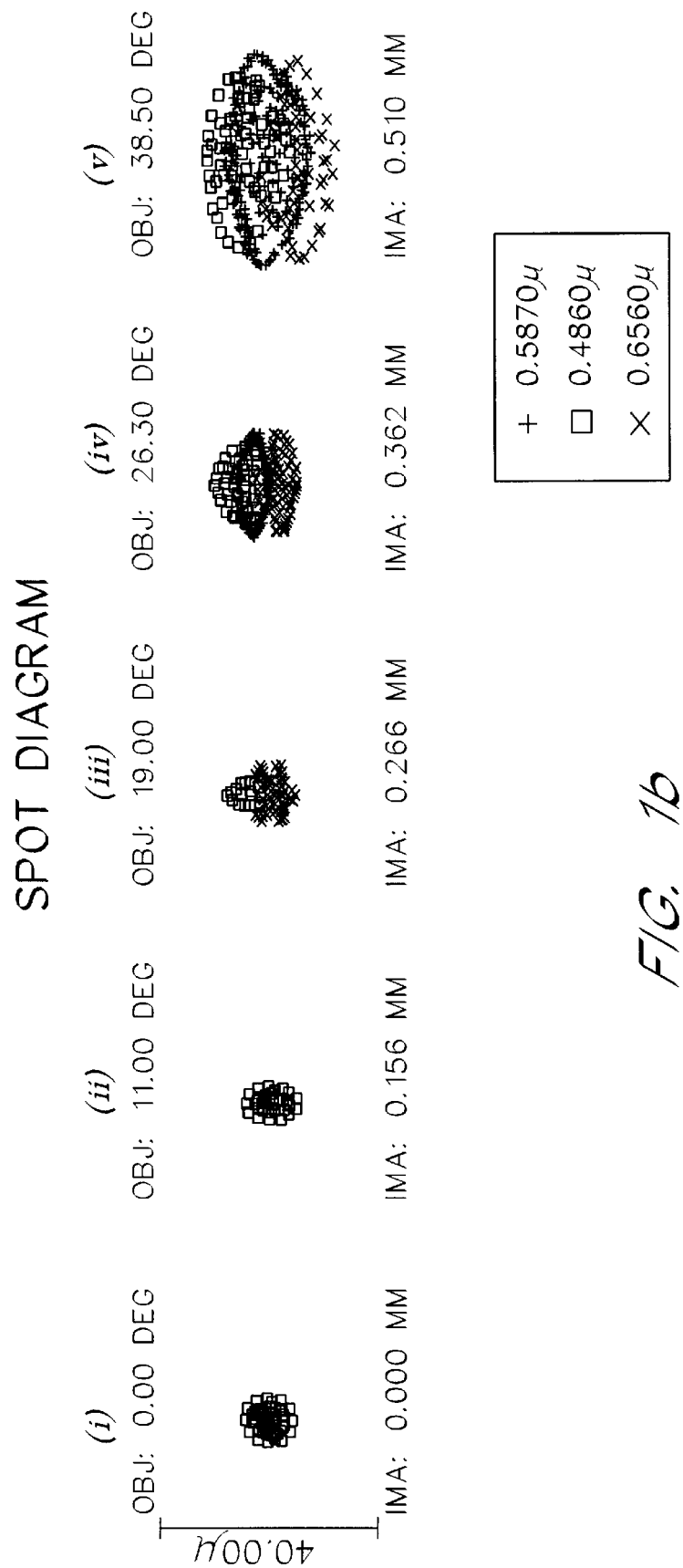

The spot diagram information of FIG. 1b corresponds to Embodiment 1 and illustrates the extent of chromatic aberrations in the focal plane 34 at the wavelengths 0.486, 0.587, and 0.656 microns, as determined for five different angles of inclination designated (i)–(v): 0 degrees (the on-axis case), 11, 19, 26.3, and 38.5 degrees (the marginal ray case, representing the maximum possible inclination). These angles correspond to the field points (i)–(v) shown in FIG. 1a as well as in FIGS. 2–11 below (except that in FIGS. 8–11 the maximum possible inclination is 37.5 degrees, corresponding to a maximum field of view of 75 degrees). Even for the marginal rays, the extent of chromatic aberration is quite limited, as can be seen in FIG. 1b. FIG. 1c illustrates the polychromatic diffraction modulation transfer functions for the same 5 field points and indicates that performance is quite good. The field curvature and distortion plots for the objective 20 shown in FIG. 1d likewise illustrate that the optical performance is good. The weighting factors used for these calculations are 1.0, 0.3, and 0.3 for 0.587, 0.486, and 0.656 microns, respectively. The apparent resolution as perceived by an observer may actually be higher than what is shown in FIG. 1c, since barrel distortion (cf. FIG. 1d) causes compression of the image at the edge of the field, an effect that may be partially deconvolved by the observer.

Figure 2:
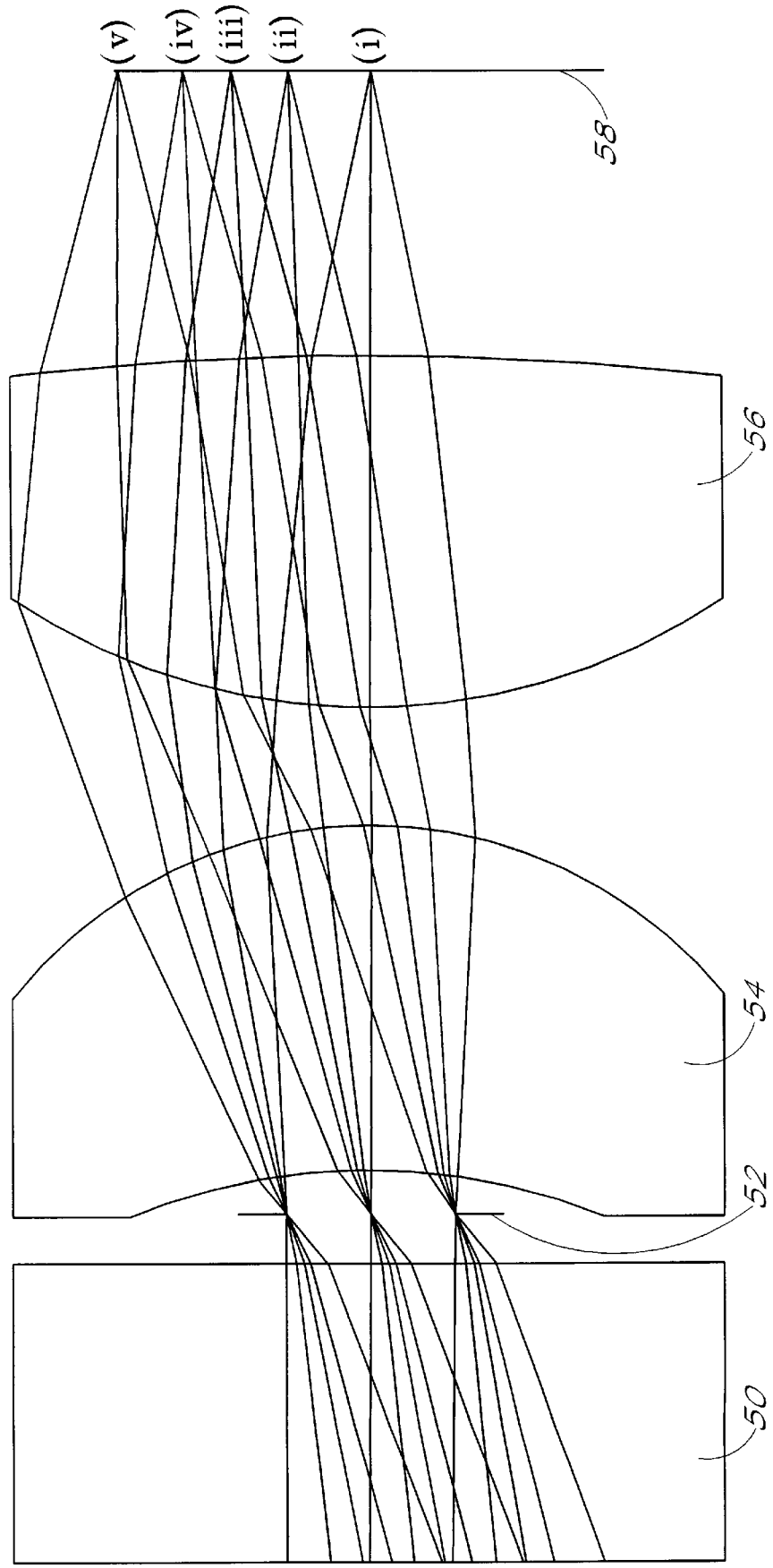
FIGS. 2–7 show additional embodiments of endoscopic landscape-type objective lens systems along with respective ray paths through the systems.

FIG. 2 shows a more optically optimized configuration corresponding to Embodiment 2, in which performance at the edge of the field is improved at the expense of design simplicity and distortion. The lens data for the second embodiment appear in Table 2, below. In this embodiment, a window 50 is followed by an aperture stop 52 and two sapphire elements 54 and 56 that are preferably noncontacting. The sapphire elements 54 and 56 have curvature on both of their respective sides, leading to improved performance of the objective. The image is focused onto a focal plane 58.

TABLE 2

EMBODIMENT 2
Image space F/# = 2.5
Effective focal length = 8.533E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object |  | Infinity | 2.000E + 001 |  | 3.252E + 001 | 0 |
| 1 | 50 | Infinity | 6.100E − 001 | Sapphire | 1.440E + 000 | 0 |
| 2 | 50 | Infinity | 0 |  | 1.440E + 000 | 0 |
| 3 (Dummy) |  | Infinity | 1.000E − 001 |  | 4.991E − 001 | 0 |
| Stop | 52 | Infinity | 8.098E − 002 |  | 3.413E − 001 | 0 |
| 5 | 54 | −1.428E + 000 | 7.000E − 001 | Sapphire | 9.600E − 001 | 0 |
| 6 | 54 | −9.330E − 001 | 2.404E − 001 |  | 1.440E + 000 | 0 |
| 7 | 56 | 1.334E + 000 | 6.999E − 001 | Sapphire | 1.440E + 000 | 0 |
| 8 | 56 | −6.719E + 000 | 5.759E − 001 |  | 1.440E + 000 | 0 |
| IMAGE | 58 | Infinity |  |  | 1.021E + 000 | 0 |

Figure 3:
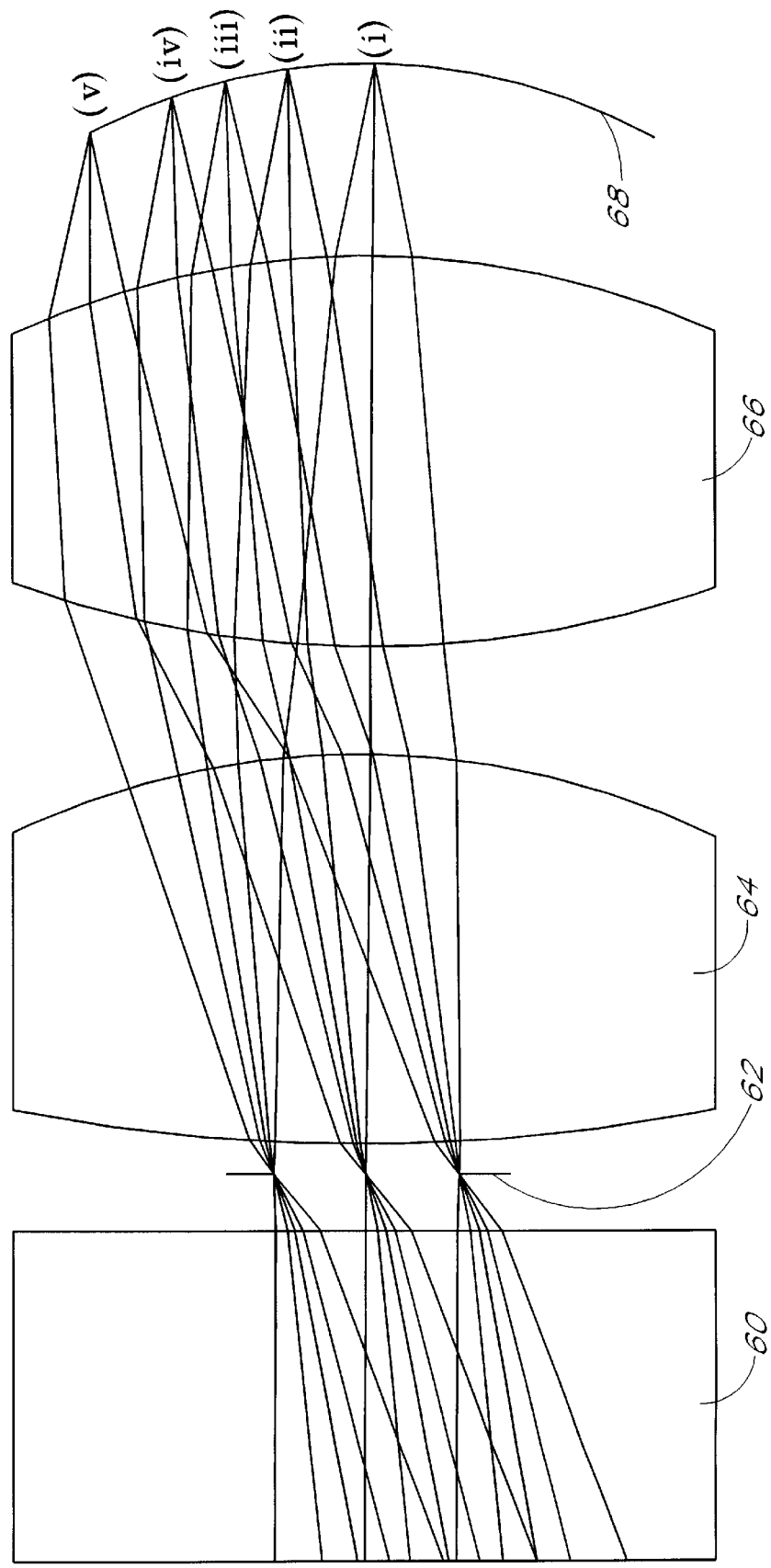

FIG. 3 shows a third embodiment, in which the image "plane" is curved to better compensate for field curvature, which is especially important at the edge of the field. The lens data for the third embodiment appear in Table 3, below. This embodiment comprises a window 60, an aperture stop 62, and sapphire elements 64 and 66, which focus the image to a curved image surface 68. The objective shown here results in acceptable distortion with excellent resolution over the full extent of the field and is pixel-limited (i.e., the resolution of the optical system is better than pixel resolution) across the entire field, given state of the art pixel technology.

TABLE 3

EMBODIMENT 3
Image space F/# = 2.5
Effective focal length = 8.351E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object |  | Infinity | 2.000E + 001 |  | 3.236E + 001 | 0 |
| 1 | 60 | Infinity | 6.100E − 001 | Sapphire | 1.260E + 000 | 0 |
| 2 | 60 | Infinity | 0 |  | 1.260E + 000 | 0 |
| 3 (Dummy) |  | Infinity | 1.000E − 001 |  | 3.340E − 001 | 0 |
| Stop | 62 | Infinity | 0 |  | 3.340E − 001 | 0 |
| 5 | 64 | 5.799E + 000 | 7.000E − 001 | Sapphire | 1.260E + 000 | 0 |
| 6 | 64 | −1.309E + 000 | 2.410E − 001 |  | 1.260E + 000 | 0 |
| 7 | 66 | 2.012E + 000 | 6.999E − 001 | Sapphire | 1.260E + 000 | 0 |
| 8 | 66 | −1.425E + 000 | 3.494E − 001 |  | 1.260E + 000 | 0 |
| IMAGE | 68 | −1.033E + 000 |  |  | 1.022E + 000 | 0 |

Figure 4:
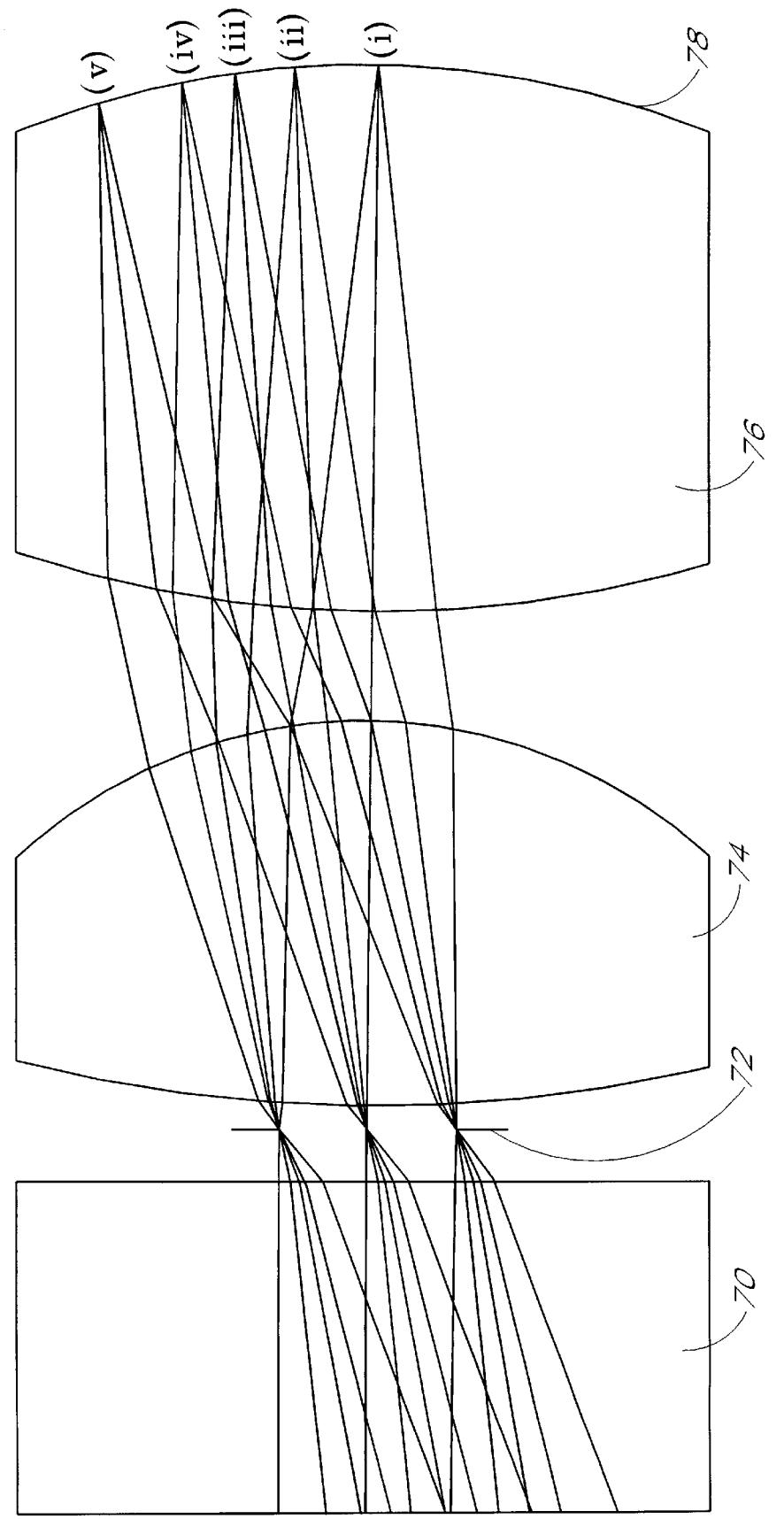

Alternative landscape-type objectives (Embodiments 4–7) are shown in FIGS. 4–7, respectively. FIG. 4 shows an objective comprising a window 70, aperture stop 72, and sapphire elements 74 and 76. The lens data for the fourth embodiment appear in Table 4, below. The image surface 78 is embedded in sapphire element 76 and is preferably aligned with the sapphire element's proximal surface, thereby facilitating direct coupling of the image into a fiber optic cable, for example. Embodiment 4 has resolution similar to Embodiment 2 with distortion performance similar to Embodiment 1.

Figure 5:
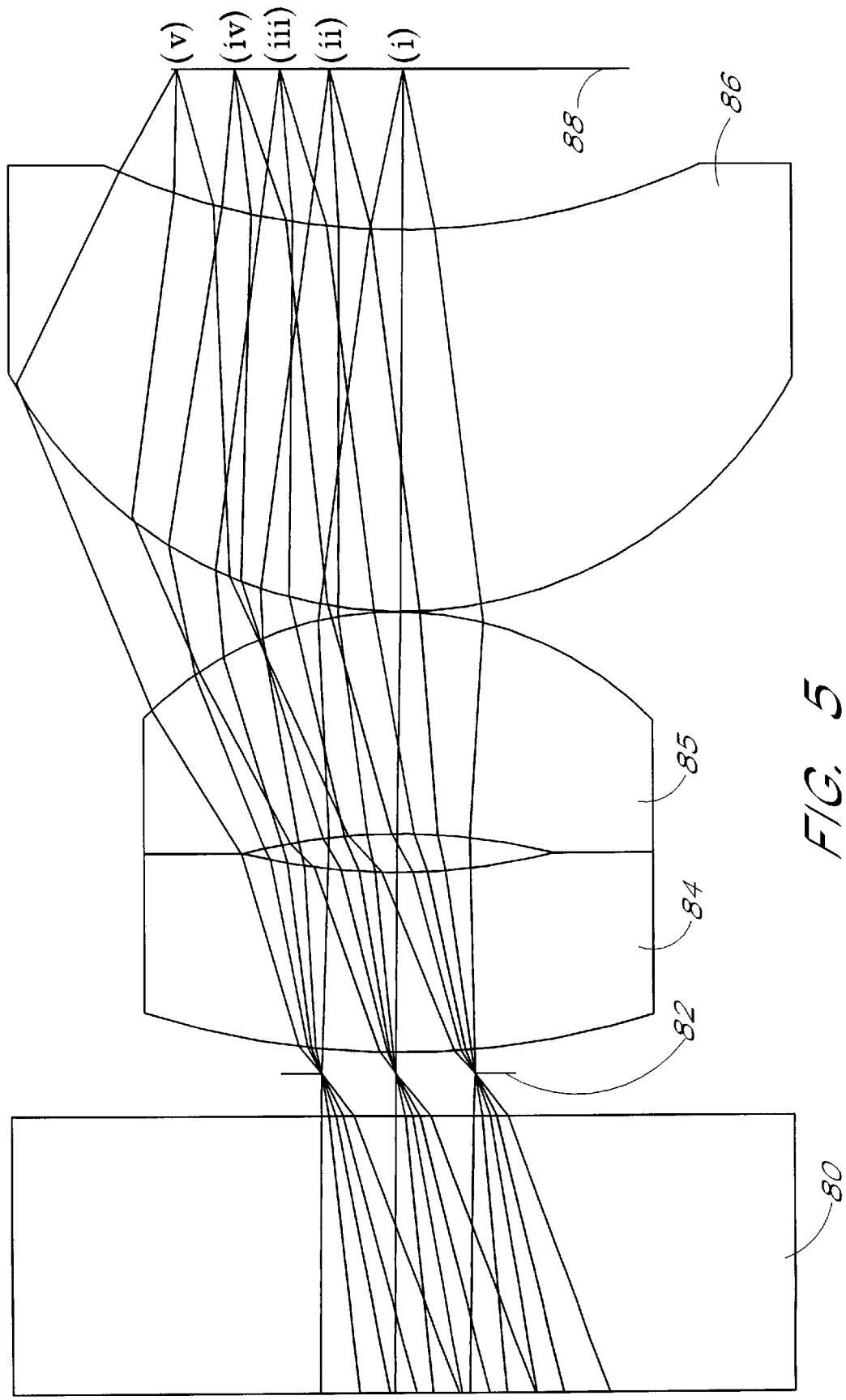

FIG. 5 illustrates an objective composed of, in addition to a window 80 and aperture stop 82, three sapphire elements 84, 85, and 86. The lens data for the fifth embodiment appear in Table 5, below. Embodiment 5 has an increased complexity to yield optical performance similar to Embodiment 3, but in a flat focal plane 88.

TABLE 4

EMBODIMENT 4
Image space F/# = 2.5
Effective focal length = 8.075E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object |  | Infinity | 2.000E + 001 |  | 3.236E + 001 | 0 |
| 1 | 70 | Infinity | 6.100E − 001 | Sapphire | 1.260E + 000 | 0 |
| 2 | 70 | Infinity | 0 |  | 1.260E + 000 | 0 |
| 3 (Dummy) |  | Infinity | 0.1 |  | 3.230E − 001 | 0 |
| Stop | 72 | Infinity | 4.782E − 002 |  | 3.230E − 001 | 0 |
| 5 | 74 | 2.869E + 000 | 7.000E − 001 | Sapphire | 1.260E + 000 | 0 |
| 6 | 74 | −9.341E − 001 | 1.992E − 001 |  | 1.260E + 000 | 0 |
| 7 | 76 | 2.242E + 000 | 9.972E − 001 | Sapphire | 1.260E + 000 | 0 |
| 8 | 76 | −1.735E + 000 | 0 |  | 1.260E + 000 | 0 |
| IMAGE | 78 | −1.735E + 000 |  |  | 1.022E + 000 | 0 |

TABLE 5

EMBODIMENT 5
Image space F/# = 2.5
Effective focal length = 8.548E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object |  | Infinity | 2.000E + 001 |  | 3.236E + 001 | 0 |
| 1 | 80 | Infinity | 6.100E − 001 | Sapphire | 1.440E + 000 | 0 |
| 2 | 80 | Infinity | 0 |  | 1.700E + 000 | 0 |
| 3 (Dummy) |  | Infinity | 0.1 |  | 3.419E − 001 | 0 |

TABLE 5-continued

EMBODIMENT 5
Image space F/# = 2.5
Effective focal length = 8.548E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Stop | 82 | Infinity | 0.1 | | 3.419E − 001 | 0 |
| 5 | 84 | 1.552E + 000 | 3.997E − 001 | Sapphire | 1.140E + 000 | 0 |
| 6 | 84 | 1.378E + 000 | 6.676E − 002 | | 6.218E − 001 | 0 |
| 7 | 85 | −1.562E + 000 | 5.659E − 001 | Sapphire | 6.218E − 001 | 0 |
| 8 | 85 | −8.066E − 001 | 0 | | 1.140E + 000 | 0 |
| 9 | 86 | 9.992E − 001 | 8.409E − 001 | Sapphire | 1.700E + 000 | 0 |
| 10 | 86 | 1.859E + 000 | 3.496E − 001 | | 1.259E + 000 | 0 |
| IMAGE | 88 | Infinity | | | 1.033E + 000 | 0 |

Figure 6:
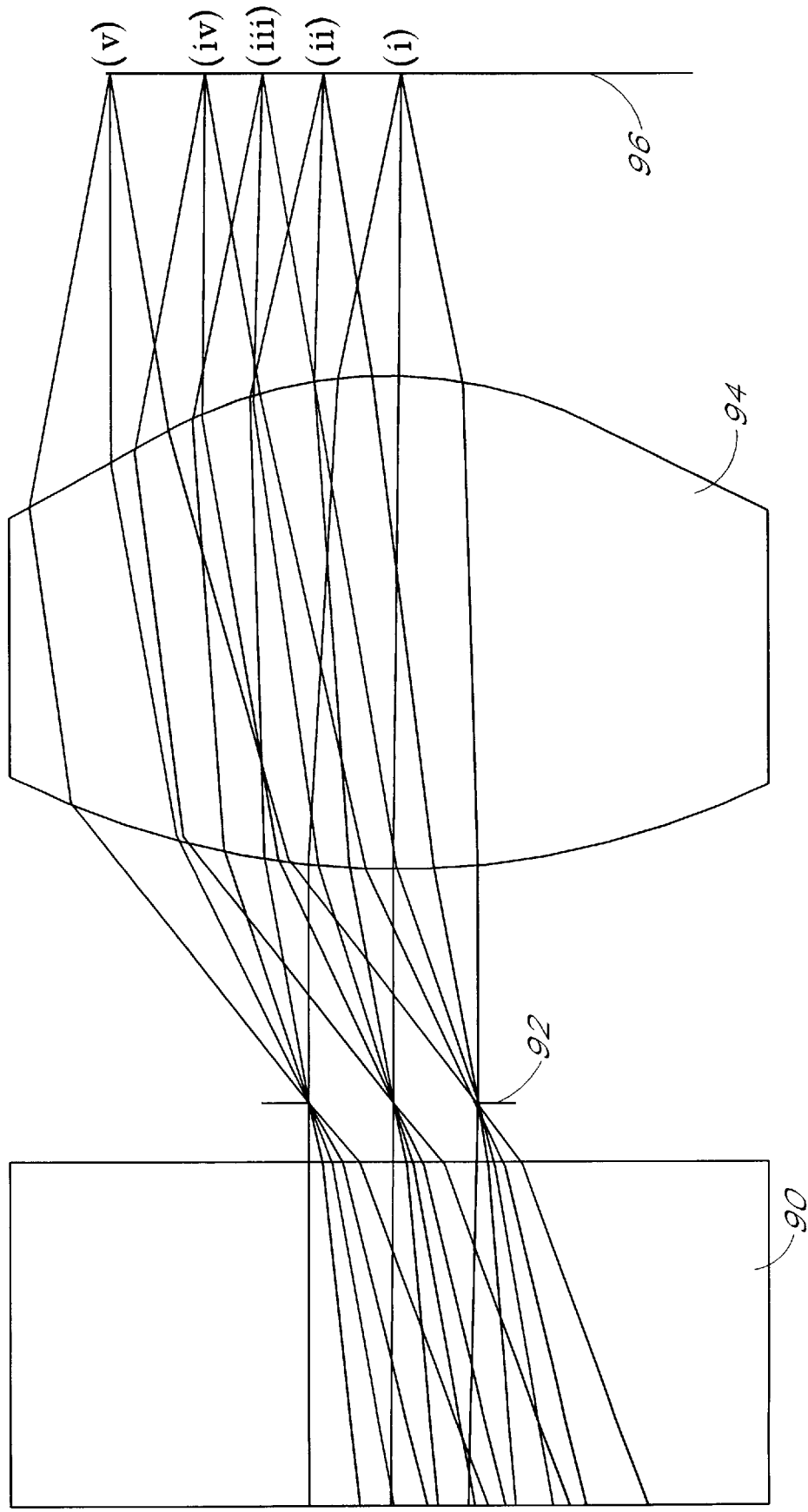

FIG. 6 shows an objective comprising a window 90, an aperture stop 92, and a single sapphire element 94 with two aspheric surfaces leading to a flat image plane 96. The lens data for the sixth embodiment appear in Table 6, below. This embodiment is easy to assemble and has a higher per lens fabrication cost due to the aspheric surfaces. It yields an objective having resolution about the same as Embodiment 1, but with improved distortion.

Figure 7:
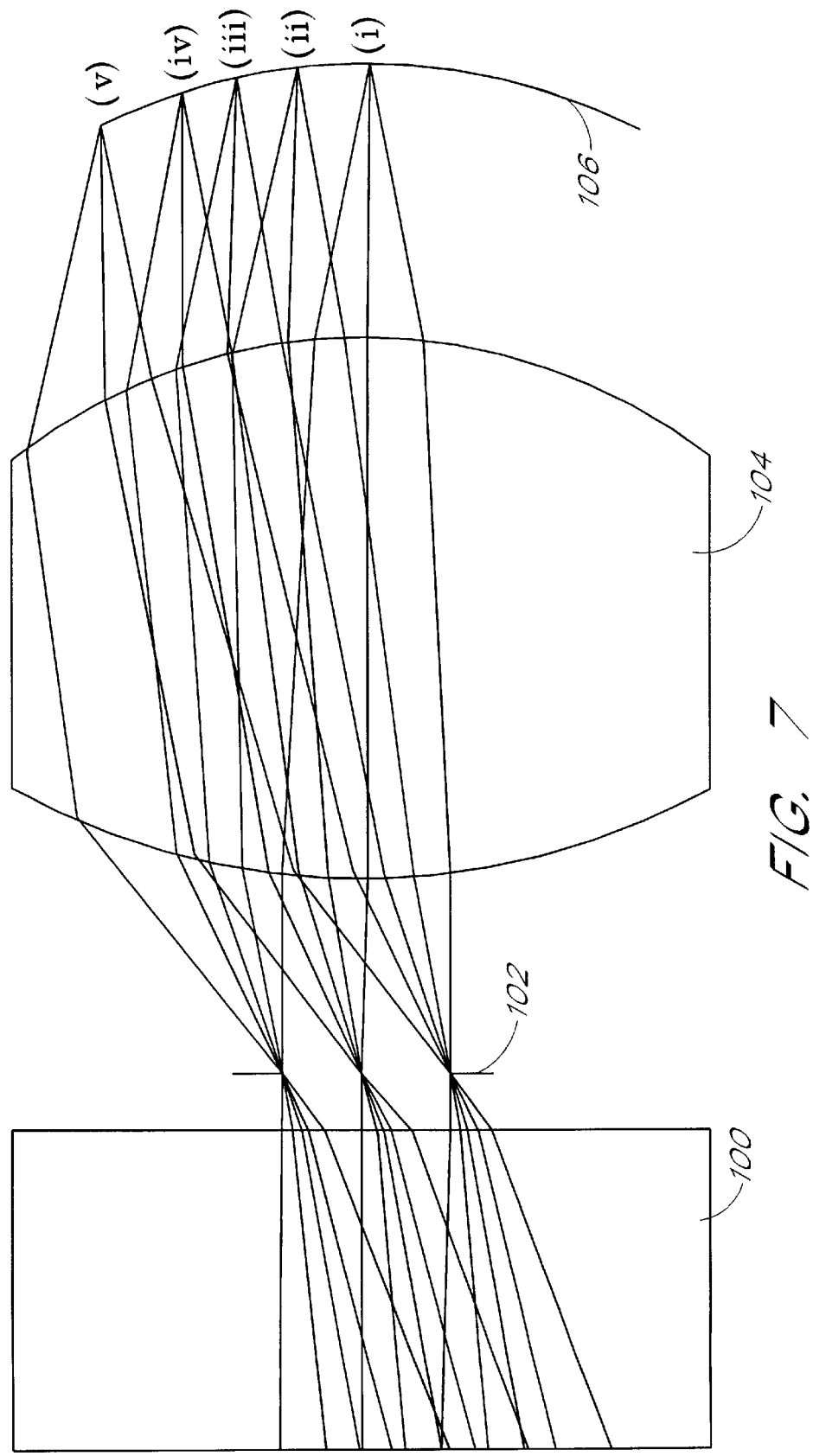

FIG. 7 shows another single sapphire lens embodiment comprising a window 100, an aperture stop 102, and a sapphire element 104 having two aspheric surfaces leading to a curved image surface 106. The lens data for the seventh embodiment appear in Table 7, below. Embodiment 7 has excellent resolution over the entire field with low distortion. Like Embodiment 3, it is pixel-limited across the entire field, in view of state of the art pixel technology.

TABLE 6

EMBODIMENT 6
Image space F/# = 2.5
Effective focal length = 7.343E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object | | Infinity | 2.000E + 001 | | 3.254E + 001 | 0 |
| 1 | 90 | Infinity | 6.100E − 001 | Sapphire | 1.340E + 000 | 0 |
| 2 | 90 | Infinity | 0 | | 4.676E − 001 | 0 |
| 3 (Dummy) | | Infinity | 1.100E − 001 | | 4.676E − 001 | 0 |
| Stop | 92 | Infinity | 4.129E − 001 | | 2.937E − 001 | 0 |
| 5 | 94 | 1.294E + 000 | 8.617E − 001 | Sapphire | 1.340E + 000 | −2.865E + 000 |
| 6 | 94 | −7.107E − 001 | 5.334E − 001 | | 1.340E + 000 | −2.924E + 000 |
| IMAGE | 96 | Infinity | | | 1.038E + 000 | 0 |

TABLE 7

EMBODIMENT 7
Image space F/# = 2.5
Effective focal length = 7.969E − 001
Maximum FOV = 7.700E + 001

| SURFACE | ELEMENT | ROC | THICKNESS | MATERIAL | DIAMETER | CONIC CONSTANT |
|---|---|---|---|---|---|---|
| Object | | Infinity | 2.000E + 001 | | 3.254E + 001 | 0 |
| 1 | 100 | Infinity | 6.100E − 001 | Sapphire | 1.320E + 000 | 0 |
| 2 | 100 | Infinity | 0 | | 4.925E − 001 | 0 |
| 3 (Dummy) | | Infinity | 1.100E − 001 | | 4.925E − 001 | 0 |
| Stop | 102 | Infinity | 3.723E − 001 | | 3.187E − 001 | 0 |
| 5 | 104 | 1.162E + 000 | 1.018E + 000 | Sapphire | 1.320E + 000 | −3.011E + 000 |
| 6 | 104 | −8.008E − 001 | 5.185E − 001 | | 1.320E + 000 | −2.395E + 000 |
| IMAGE | 106 | −1.181E + 000 | | | 1.037E + 000 | 0 |

Figure 8:
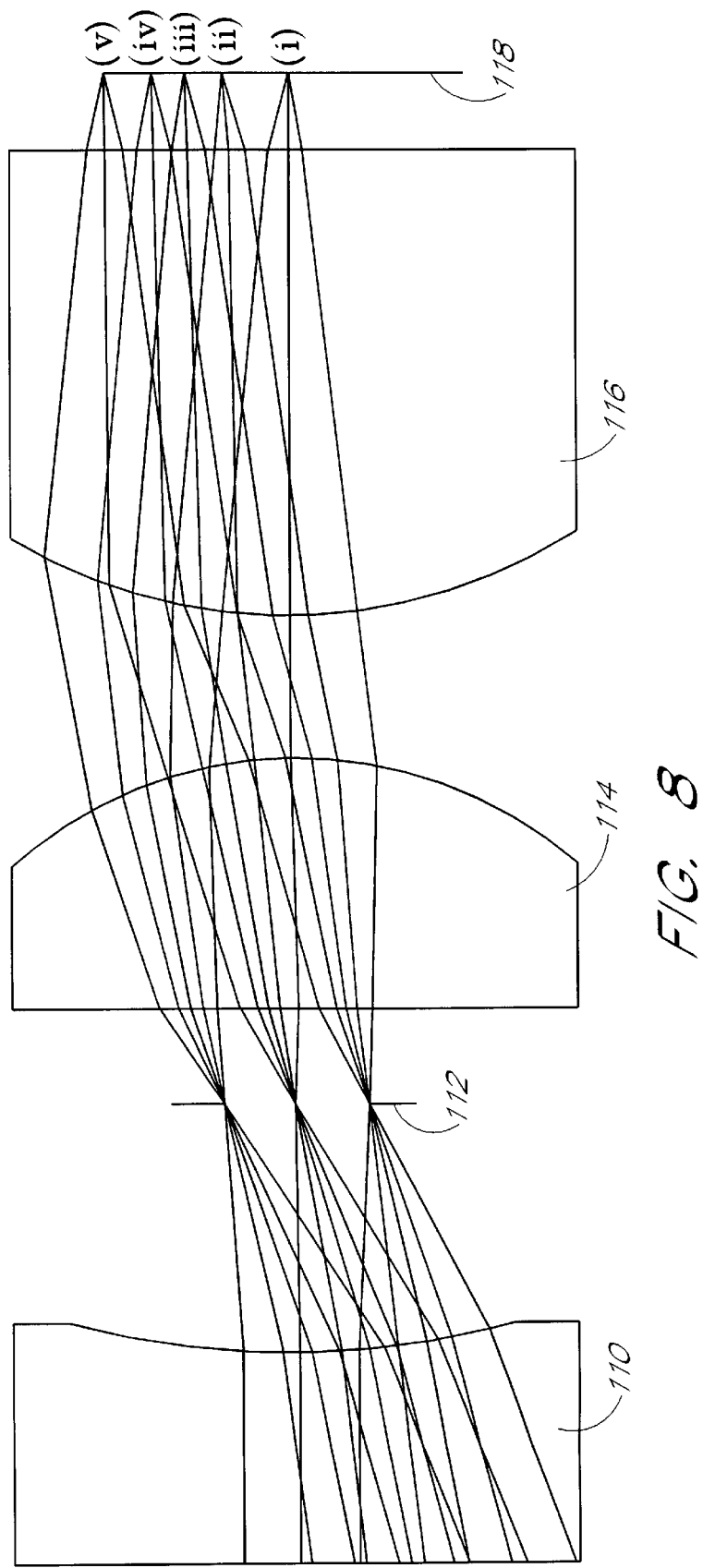
FIG. 8 shows an embodiment of an endoscopic retrofocus-type objective lens system along with ray paths through the system.

FIGS. 8–11 show retrofocus-type objectives corresponding to Embodiments 8–11. In FIG. 8, a plano-convex element 110 that is preferably made of sapphire acts simultaneously as a window and as a negative lens, due to the curvature of its proximal surface. The objective further comprises an aperture stop 112 proximal to the element 110 and two sapphire elements 114 and 116, leading to a focal plane 118. The performance is about the same as in Embodiment 2.

Respective pairs of optical elements 124 and 126, 134 and 136, and 144 and 146 focus light on respective image planes 128, 138, and 148. The optical elements of Embodiments 9–11 are all preferably sapphire. The focal plane 128 of Embodiment 9 is embedded in optical element 126. Embodiment 9 has about the same performance as Embodiment 8 but with improved distortion. The image plane 138 of Embodiment 10 is likewise embedded in optical element

TABLE 8

EMBODIMENT 8
Image space F/# = 2.5
Effective focal length = 8.717E − 001
Maximum FOV = 7.500E + 001

| SURFACE | ELEMENT | ROC | THICKNESS | MATERIAL | DIAMETER | CONIC CONSTANT |
|---|---|---|---|---|---|---|
| Object |  | Infinity | 2.000E + 001 |  | 3.212E + 001 | 0 |
| 1 | 110 | Infinity | 6.000E − 001 | Sapphire | 1.600E + 000 | 0 |
| 2 | 110 | 2.990 + 000 | 7.000E − 001 |  | 1.092E + 000 | 0 |
| Stop | 112 | Infinity | 2.710E − 001 |  | 4.130E − 001 | 0 |
| 4 | 114 | Infinity | 7.000E − 001 | Sapphire | 7.678E − 001 | 0 |
| 5 | 114 | −1.215 + 000 | 4.029E − 001 |  | 1.600E + 000 | 0 |
| 6 | 116 | 1.551 + 000 | 1.3000 + 0000 | Sapphire | 1.600E + 000 | 0 |
| 7 | 116 | Infinity | 2.340E − 001 |  | 1.128E + 000 | 0 |
| IMAGE | 118 | Infinity |  |  | 1.031E + 000 | 0 |

Figure 9:
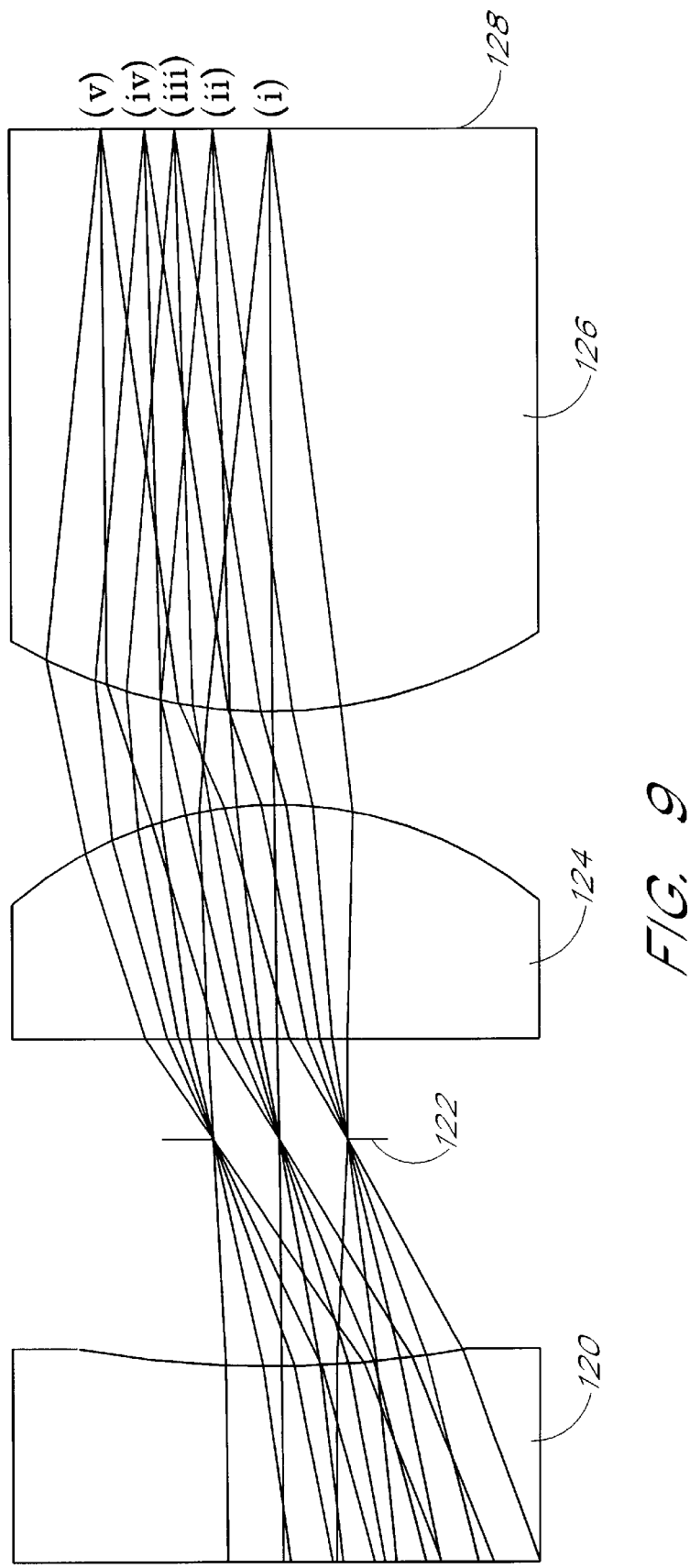
FIGS. 9–11 show additional embodiments of endoscopic retrofocus-type objective lens systems.
Figure 10:
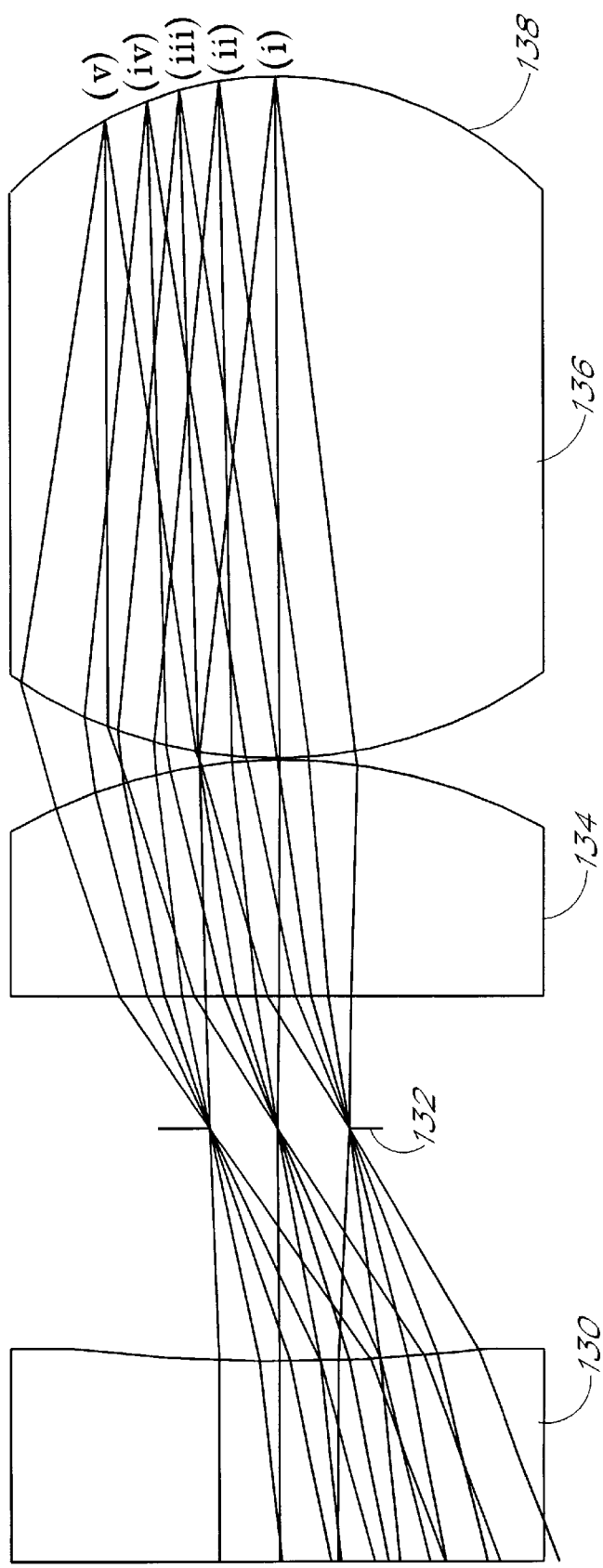
Figure 11:
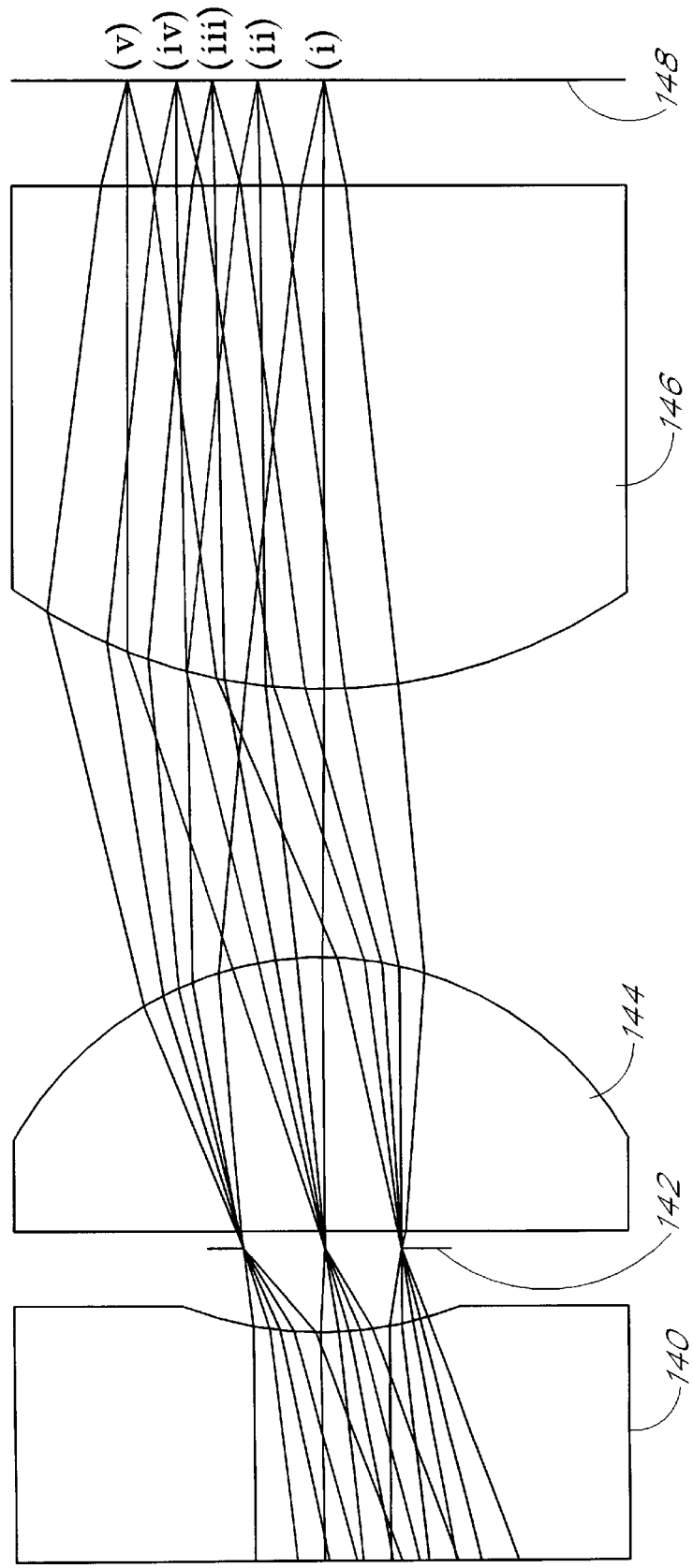

The embodiments shown in FIGS. 9–11 also comprise elements that simultaneously act as a window and negative lens, namely, plano-convex elements 120, 130, and 140. These embodiments include respective aperture stops 122, 132, and 142 on the proximal of the plano-convex elements 120, 130, and 140. The lens data for the ninth through eleventh embodiments appear in Tables 9–11, below.

136. As in Embodiment 3, the field curvature in Embodiment 10 is corrected, providing resolution that is pixel-limited given state of the art fiber image bundles. Embodiment 11 employs an aspheric surface as the proximal surface of the plano-convex element 140 to provide performance similar to that of Embodiment 10,

TABLE 9

EMBODIMENT 9
Image space F/# = 2.5
Effective focal length = 8.748E − 001
Maximum FOV = 7.500E + 001

| SURFACE | ELEMENT | ROC | THICKNESS | MATERIAL | DIAMETER | CONIC CONSTANT |
|---|---|---|---|---|---|---|
| Object |  | Infinity | 20 |  | 32.14 | 0 |
| 1 | 120 | Infinity | 0.6 | Sapphire | 1.6 | 0 |
| 2 | 120 | 3.418 | 0.7000 |  | 1.24 | 0 |
| Stop | 122 | Infinity | 0.3119 |  | 0.4066 | 0 |
| 4 | 124 | Infinity | 0.7 | Sapphire | 0.8207 | 0 |
| 5 | 124 | −1.267 | 0.2908 |  | 1.6 | 0 |
| 6 | 126 | 1.549 | 1.790 | Sapphire | 1.6 | 0 |
| EMBEDDED IMAGE | 126, 128 | Infinity | 0 |  | 1.6 | 0 |

TABLE 10

EMBODIMENT 10
Image space F/# = 2.5
Effective focal length = 9.309E − 001
Maximum FOV = 7.500E + 001

| SURFACE | ELEMENT | ROC | THICKNESS | MATERIAL | DIAMETER | CONIC CONSTANT |
|---|---|---|---|---|---|---|
| Object |  | Infinity | 20 |  | 32.18 | 0 |
| 1 | 130 | Infinity | 0.6 | Sapphire | 1.6 | 0 |
| 2 | 130 | 5.070 | 0.7000 |  | 1.24 | 0 |
| Stop | 132 | Infinity | 0.3915 |  | 0.4135 | 0 |

TABLE 10-continued

EMBODIMENT 10
Image space F/# = 2.5
Effective focal length = 9.309E − 001
Maximum FOV = 7.500E + 001

| SURFACE | ELEMENT | ROC | THICKNESS | MATERIAL | DIAMETER | CONIC CONSTANT |
|---|---|---|---|---|---|---|
| 4 | 134 | Infinity | 0.7 | Sapphire | 0.9852 | 0 |
| 5 | 134 | −1.656 | 0 |  | 1.6 | 0 |
| 6 | 136 | 1.381 | 2.029 | Sapphire | 1.6 | 0 |
| EMBEDDED IMAGE | 136, 138 | −1.124 | 0 |  | 1.6 | 0 |

TABLE 11

EMBODIMENT 11
Image space F/# = 2.5
Effective focal length = 8.945E − 001
Maximum FOV = 7.500E + 001

| SURFACE | ELEMENT | ROC | THICKNESS | MATERIAL | DIAMETER | CONIC CONSTANT |
|---|---|---|---|---|---|---|
| Object |  | Infinity | 2.000E + 001 |  | 3.151E + 001 | 0 |
| 1 | 140 | Infinity | 6.000E − 001 | Sapphire | 1.600E + 000 | 0 |
| 2 | 140 | 1.125E + 000 | 2.232E − 001 |  | 7.000E − 001 | 6.300E + 000 |
| Stop | 142 | Infinity | 4.492E − 002 |  | 4.139E − 001 | 0 |
| 4 | 144 | Infinity | 7.000E − 001 | Sapphire | 4.875E − 001 | 0 |
| 5 | 144 | −9.271E − 001 | 7.000E − 001 |  | 1.600E + 000 | 0 |
| 6 | 146 | 1.401E + 000 | 1.300E + 000 | Sapphire | 1.600E + 000 | 0 |
| 7 | 146 | Infinity | 2.720E − 001 |  | 1.600E + 000 | 0 |
| IMAGE | 148 | Infinity |  |  | 1.600E + 000 | 0 |

Although the present invention is described herein with respect to endoscopic objective lens systems, it will be understood by those in the art that the principles disclosed herein can be used to design other optical systems, e.g., microscope objectives, optical systems for photocopier machines and the like, which use a wide field of view with low dispersion in perhaps a rugged environment with a broad temperature range. While sapphire has been emphasized, it should be noted that other, future materials having the same optical characteristics as sapphire would be within the spirit and scope of the present invention.

What is claimed is:

1. An objective lens system for forming an image at the distal end of an endoscope to be transmitted to the proximal end of the endoscope, comprising:
   a first optical group, said first optical group having positive optical power and including a plurality of optical components, more than one of which comprises sapphire to reduce optical aberrations;
   an aperture stop on the object side of said first optical group; and
   a second optical group, in which said second optical group is on the object side of said first optical group
   in which said second optical group comprises an optical window and said objective lens system is of the landscape type.

2. The objective lens system of claim 1, said first optical group comprising two sapphire elements that contact each other.

3. The objective lens system of claim 1, said first optical group comprising two noncontacting sapphire elements.

4. The objective lens system of claim 1, in which the image at the distal end of the endoscope is nonplanar at its focus.

5. The objective lens system of claim 4, in which the image at the distal end of the endoscope is at a focus near the proximal surface of an optical element.

6. The objective lens system of claim 1, said first optical group comprising three sapphire elements.

7. The objective lens system of claim 1, further comprising relay optics and an eyepiece to form an endoscope.

8. An objective lens system for forming an image at the distal end of an endoscope to be transmitted to the proximal end of the endoscope, comprising:
   a first optical group, said first optical group having positive optical power and including a plurality of optical components, more than one of which comprises sapphire to reduce optical aberrations,
   an aperture stop on the object side of said first optical group; and
   a second optical group, in which said second optical group is on the object side of said first optical group, and
   in which said aperture stop is located between said first and said second optical groups.

9. The objective lens system of claim 8, further comprising relay optics and an eyepiece to form an endoscope.

10. An objective lens system for forming an image at the distal end of an endoscope to be transmitted to the proximal end of the endoscope, comprising:
    a first optical group, said first optical group having positive optical power and including a plurality of optical components, more than one of which comprises sapphire to reduce optical aberrations;

an aperture stop on the object side of said first optical group; and a second optical group, in which said second optical group is on the object side of said first optical group, in which said second optical group is of negative optical power and said objective lens system is of the retrofocus type.

11. The objective lens system of claim 10, in which said first optical group comprises two noncontacting sapphire elements and the image at the distal end of the endoscope is at a planar focus.

12. The objective lens system of claim 11, in which the planar focus is near the proximal surface of an optical element.

13. The objective lens system of claim 10, in which said first optical group comprises two contacting sapphire elements and the image at the distal end of the endoscope is at a nonplanar focus.

14. The objective lens system of claim 10, further comprising relay optics and an eyepiece to form an endoscope.

15. An objective lens system for forming an image at the distal end of an endoscope to be transmitted to the proximal end of the endoscope, comprising:

an all sapphire, first optical group, said first optical group having positive optical power and including at least one optical component, said first optical group comprising sapphire to reduce optical aberrations;

an aperture stop on the object side of said first optical group; and a second optical group, in which said second optical group is on the object side of said first optical group, and in which said first optical group is a single sapphire element and the image at the distal end of the endoscope is non-planar at its focus.

16. The objective lens system of claim 15, further comprising relay optics and an eyepiece to form an endoscope.

17. An objective lens system for forming an image at the distal end of an endoscope to be transmitted to the proximal end of the endoscope, comprising:

an all sapphire, first optical group, said first optical group having positive optical power and including at least one optical component, said first optical group comprising sapphire to reduce optical aberrations;

an aperture stop on the object side of said first optical group; and a second optical group, in which said second optical group is on the object side of said first optical group, and in which said second optical group comprises an optical window and said objective lens system is of the landscape type.

18. The objective lens system of claim 17, in which said first optical group is a single sapphire element that focuses the image at the distal end of the endoscope to an image plane.

19. The objective lens system of claim 17, further comprising relay optics and an eyepiece to form an endoscope.

20. An objective lens system having an object side and an image side, comprising:

a first optical group, said first optical group having positive optical power and including a plurality of optical components, more than one of which has an index of refraction greater than 1.7 and an Abbe number of at least 65 to reduce optical aberrations; and an aperture stop on the object side of said first optical group.

21. The objective lens system of claim 20, comprising:

a second optical group, in which said second optical group is on the object side of said first optical group and includes an optical window, and in which said objective lens system is of the landscape type.

22. The objective lens system of claim 21, said first optical group comprising two sapphire elements that contact each other.

23. The objective lens system of claim 21, said first optical group comprising two non-contacting sapphire elements.

24. The objective lens system of claim 21, in which the image at the distal end of the endoscope is non-planar at its focus.

25. The objective lens system of claim 24, in which the image at the distal end of the endoscope is at a focus near the proximal surface of an optical element.

26. The objective lens system of claim 21, said first optical group comprising three sapphire elements.

27. The objective lens system of claim 21, further comprising relay optics and an eyepiece to form an endoscope.

28. The objective lens system of claim 20, further comprising a second optical group, in which said second optical group is on the object side of said first optical group, and in which said aperture stop is located between said first and said second optical groups.

29. The objective lens system of claim 28, further comprising relay optics and an eyepiece to form an endoscope.

30. The objective lens system of claim 20, further comprising a second optical group, in which said second optical group is on the object side of said first optical group, and in which said second optical group is of negative optical power and said objective lens system is of the retrofocus type.

31. The objective lens system of claim 30, in which said first optical group comprises two non-contacting sapphire elements and the image at the distal end of the endoscope is at a planar focus.

32. The objective lens system of claim 31, in which the planar focus is near the proximal surface of an optical element.

33. The objective lens system of claim 30, in which said first optical group comprises two contacting sapphire elements and the image at the distal end of the endoscope is at a non-planar focus.

34. The objective lens system of claim 30, further comprising relay optics and an eyepiece to form an endoscope.

35. An objective lens system having an object side and an image side, comprising:

a first optical group having positive optical power and including at least one optical component, said first optical group consisting essentially of optical material having an index of refraction greater than 1.7 and an Abbe number of at least 65 to reduce optical aberrations; and an aperture stop on the object side of said first optical group.

36. The objective lens system of claim 35, further comprising:

a second optical group, in which said second optical group is on the object side of said first optical group, and in which said first optical group is a single sapphire element and the image at the distal end of the endoscope is non-planar at its focus.

37. The objective lens system of claim 36, further comprising relay optics and an eyepiece to form an endoscope.

38. The objective lens system of claim 35, further comprising:
 a second optical group, in which said second optical group is on the object side of said first optical group and comprises an optical window, and
 in which said objective lens system is of the landscape type.

39. The objective lens system of claim 38, further comprising relay optics and an eyepiece to form an endoscope.

40. The objective lens system of claim 38, in which said first optical group is a single sapphire element that focuses the image at the distal end of the endoscope to an image plane.

41. A method of forming an image of an object, comprising:
 imaging light through an objective, the objective including a first optical group having positive optical power and further including an aperture stop on the object side of the first optical group, the first optical group including a plurality of optical components of which more than one includes sapphire to reduce optical aberrations of the light imaged through the objective;
 forming an image at the distal end of the objective; and
 transmitting the image to the proximal end of an endoscope.

42. A method of forming an image of an object, comprising:
 imaging light through an objective, the objective including a first optical group having positive optical power and further including an aperture stop on the object side of the first optical group, the first optical group consisting essentially of sapphire to reduce optical aberrations of the light imaged through the objective;
 forming an image at the distal end of the objective; and
 transmitting the image to the proximal end of an endoscope.

43. An objective lens system for forming an image at the distal end of an endoscope to be transmitted to the proximal end of the endoscope, comprising:
 a first optical group, said first optical group having positive optical power and including a plurality of optical components, more than one of which comprises sapphire; and
 an aperture stop on the object side of said first optical group, said aperture stop being conjugate with both an entrance pupil and an exit pupil of said lens system.

44. An objective lens system for forming an image at the distal end of an endoscope to be transmitted to the proximal end of the endoscope, comprising:
 an all sapphire, first optical group, said first optical group having positive optical power and including at least one optical component; and
 an aperture stop on the object side of said first optical group, said aperture stop being conjugate with both an entrance pupil and an exit pupil of said lens system.

45. An objective lens system for forming an image at the distal end of an endoscope to be transmitted to the proximal end of the endoscope, comprising:
 a first optical group, said first optical group having positive optical power and including a plurality of optical components, more than one of which comprises sapphire;
 an aperture stop on the object side of said first optical group; and
 a second optical group of non-negative optical power, in which said second optical group is on the object side of said first optical group, said first optical group, said aperture stop, and said second optical group forming an objective lens system.

46. An objective lens system for forming an image at the distal end of an endoscope to be transmitted to the proximal end of the endoscope, comprising:
 a first optical group, said first optical group having positive optical power and including a plurality of optical components, more than one of which comprises sapphire;
 an aperture stop on the object side of said first optical group; and
 a second optical group, in which said second optical group is on the object side of said aperture stop, wherein said first optical group, said aperture stop, and said second optical group form an objective lens system.

47. An objective lens system for forming an image at the distal end of an endoscope to be transmitted to the proximal end of the endoscope, comprising:
 an all sapphire, first optical group, said first optical group having positive optical power and including at least one optical component;
 an aperture stop on the object side of said first optical group; and
 a second optical group, in which said second optical group is on the object side of said aperture stop, wherein said first optical group, said aperture stop, and said second optical group form an objective lens system.

48. An objective lens system for forming an image at the distal end of an endoscope to be transmitted to the proximal end of the endoscope, comprising:
 a first optical group, said first optical group having positive optical power and including a plurality of optical components, more than one of which comprises sapphire;
 an aperture stop on the object side of said first optical group; and
 a second optical group, in which said second optical group is on the object side of said first optical group, said first optical group, said aperture stop, and said second optical group forming an objective lens system capable of imaging a field of view of up to 80 degrees.

49. The objective lens system of claim 48, in which said second optical group comprises an optical window and said objective lens system is of the landscape type.

50. The objective lens system of claim 49, said first optical group comprising two sapphire elements that contact each other.

51. The objective lens system of claim 49, said first optical group comprising two non-contacting sapphire elements.

52. The objective lens system of claim 49, in which the image at the distal end of the endoscope is non-planar at its focus.

53. The objective lens system of claim 52, in which the image at the distal end of the endoscope is at a focus near the proximal surface of an optical element.

54. The objective lens system of claim 49, said first optical group comprising three sapphire elements.

55. The objective lens system of claim 48, in which said aperture stop is located between said first and said second optical groups.

56. The objective lens system of claim 48, in which said second optical group is of negative optical power and said objective lens system is of the retrofocus type.

57. The objective lens system of claim 56, in which said first optical group comprises two non-contacting sapphire elements and the image at the distal end of the endoscope is at a planar focus.

58. The objective lens system of claim 57, in which the planar focus is near the proximal surface of an optical element.

59. The objective lens system of claim 56, in which said first optical group comprises two contacting sapphire elements and the image at the distal end of the endoscope is at a non-planar focus.

60. The objective lens system of claim 48, further comprising relay optics and an eyepiece to form an endoscope.

* * * * *